(12) United States Patent
Nitsuma et al.

(10) Patent No.: US 12,192,801 B2
(45) Date of Patent: Jan. 7, 2025

(54) MEASURING DEVICE AND MEASURING METHOD

(71) Applicant: ANRITSU CORPORATION, Kanagawa (JP)

(72) Inventors: Yuki Nitsuma, Kanagawa (JP); Takaaki Kamisawa, Kanagawa (JP); Katsuo Sakurai, Kanagawa (JP); Issei Fukuda, Kanagawa (JP); Tomoya Sano, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 408 days.

(21) Appl. No.: 17/559,370

(22) Filed: Dec. 22, 2021

(65) Prior Publication Data
US 2022/0217555 A1    Jul. 7, 2022

(30) Foreign Application Priority Data

Jan. 7, 2021    (JP) .................................. 2021-001660

(51) Int. Cl.
*H04W 24/06*    (2009.01)

(52) U.S. Cl.
CPC .................................. *H04W 24/06* (2013.01)

(58) Field of Classification Search
CPC .............. H04B 17/318; H04B 17/3912; H04B 17/0087; H04B 17/391; H04B 7/0695; H04B 17/104; H04B 17/16; H04B 7/00; H04B 7/0404; H04B 7/0452; H04B 7/0632; H04B 7/0639; H04B 7/066; H04B 7/088; G06F 9/485; G06F 9/5066; H04L 1/0026; H04L 1/0036; H04L 1/0091; H04L 1/06; H04L 1/16; H04L 1/1657; H04L 1/1671; H04L 5/0023; H04L 5/0048; H04L 5/005; H04L 5/0053; H04L 5/0055; H04L 5/0064; H04L 5/0087; H04L 5/0098;

(Continued)

(56) References Cited

U.S. PATENT DOCUMENTS

| | | | | |
|---|---|---|---|---|
| 5,907,797 A | * | 5/1999 | Hanatatsu | ............... H04B 17/16 |
| | | | | 455/115.2 |
| 2006/0168587 A1 | * | 7/2006 | Aslam-Mir | ........... G06F 9/5066 |
| | | | | 718/105 |
| 2020/0059345 A1 | * | 2/2020 | Pelletier | .................... H04L 1/16 |

(Continued)

FOREIGN PATENT DOCUMENTS

| | | | |
|---|---|---|---|
| JP | 2015-192349 A | 11/2015 | |
| JP | 2022106565 A | * 7/2022 | ............. H04W 24/06 |
| JP | 7366947 B2 | * 10/2023 | ............. H04W 24/06 |

*Primary Examiner* — Matthew C Sams
(74) *Attorney, Agent, or Firm* — Pearne & Gordon LLP

(57) ABSTRACT

A measuring device 1 tests the operation of the communication function of an UE 70 by performing communication simulating a base station with the UE 70, and includes a reception unit 11a that receives a signal to be measured transmitted from the UE 70, a signal data calculation unit 12 that converts the signal to be measured into a digital signal and calculates signal data, a trigger signal output unit 13 that outputs a trigger signal at a predetermined timing when a predetermined trigger condition is satisfied, a signal extraction unit 14 that receives the trigger signal, and extracts IQ data in a predetermined section according to the predetermined timing from the signal data, and an IQ data analysis unit 52 that analyzes the extracted IQ data.

10 Claims, 8 Drawing Sheets

(58) Field of Classification Search
CPC ..... H04W 24/06; H04W 16/28; H04W 52/00; H04W 52/0225; H04W 72/0453; H04W 74/006
See application file for complete search history.

(56) References Cited

U.S. PATENT DOCUMENTS

2022/0217555 A1\* 7/2022 Nitsuma .............. H04B 17/318
2023/0344497 A1\* 10/2023 Wang .................. H04B 7/0639

\* cited by examiner

O = 1
L = 6

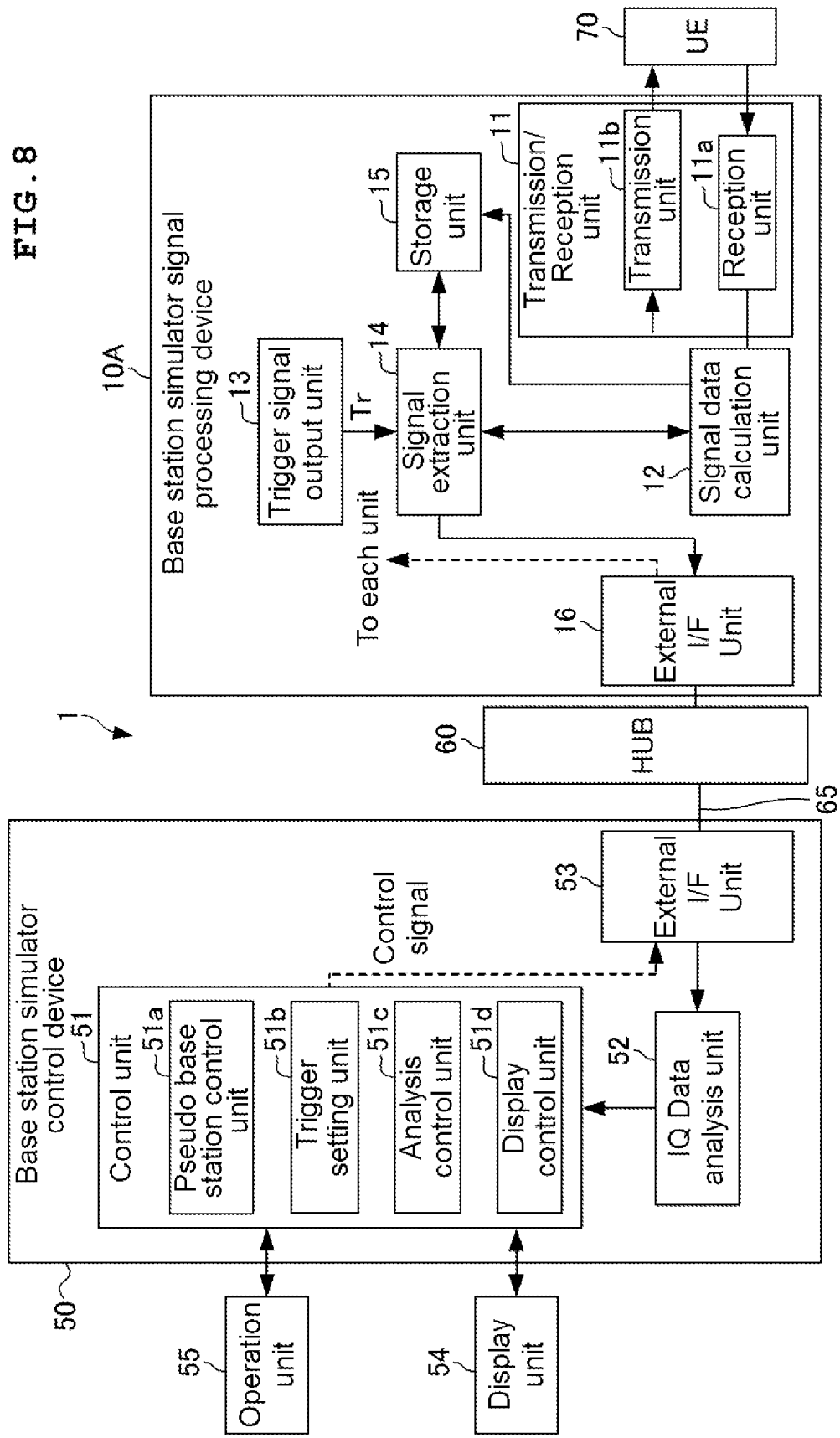

MEASURING DEVICE AND MEASURING METHOD

TECHNICAL FIELD

The present invention relates to a measuring device having a signal analysis function that receives and analyzes a signal to be measured transmitted from a mobile terminal when testing a mobile terminal by simulating a base station, and a measuring method.

BACKGROUND ART

For example, in a mobile phone system, with the multi-functionalization of the mobile terminals, the wireless communication speed with mobile terminals and a wireless base station (hereinafter referred to as a base station) has been increased. In recent years, for example, technological development for shifting from 4th generation (4G) services that employ the LTE-Advanced method or the like to 5th generation (5G) services is progressing.

Against this background, new models of mobile communication terminals (hereinafter referred to as mobile terminals) such as mobile phones have been developed one after another, and it is necessary to test whether or not the newly developed mobile terminals operate normally.

As a device for testing a mobile terminal, a testing device has been known which communicates with a pseudo terminal that simulates the communication function of a new mobile terminal that transmits and receives a radio frequency signal corresponding to a predetermined communication standard and tests the operation of the communication function (see, for example, Patent Document 1).

In this testing device, it is possible to accurately evaluate a pseudo terminal that cannot perform real-time communication by performing an uplink data reception arithmetic process or a downlink data transmission in accordance with predetermined conditions, under the control of management means.

RELATED ART DOCUMENT

Patent Document

[Patent Document 1] JP-A-2015-192349

DISCLOSURE OF THE INVENTION

Problem that the Invention is to Solve

The testing device described in Patent Document 1 can analyze not only the main data in the signals (uplink data and downlink data) transmitted to and received from the pseudo terminal but also the signal of the physical layer. However, the testing device described in Patent Document 1 only controls the timing for matching the transmission/reception timings between the pseudo terminal to be tested and the testing device side, and does not have a function of performing control to analyze the transmitted/received signals under which communication state, for which signal or channel.

Therefore, although the testing device described in Patent Document 1 analyzes the signal data up to the physical layer in accordance with the reception or transmission of main data, but has a problem that it is difficult to set conditions including, for example, a signal type, a channel, or a reception status such as the normality or abnormality of the signal and analyze IQ data corresponding to the communication state satisfying the conditions.

The present invention has been made to solve such a conventional problem, and an object of the present invention is to provide a measuring device and a measuring method capable of setting conditions including a signal type, a channel, and a reception status, and performing detailed analysis of IQ data corresponding to a communication state satisfying the conditions.

Means for Solving the Problem

In order to solve the above problems, a measuring device according to claim 1 of the present invention has a configuration including a reception unit (11a) that receives a signal to be measured transmitted from a mobile terminal (70); a signal data calculation unit (12) that converts the signal to be measured into a digital signal and calculates signal data; a trigger signal output unit (13) that outputs a trigger signal at a predetermined timing when a predetermined trigger condition is satisfied; a signal extraction unit (14) that receives the trigger signal, and extracts IQ data in a predetermined section according to the predetermined timing from the signal data; and an IQ data analysis unit (52) that analyzes the extracted IQ data.

With this configuration, the measuring device according to claim 1 of the present invention can acquire IQ data in a predetermined section of the signal to be measured and analyze the IQ data only under a communication state satisfying the trigger condition, and can support a detailed analysis process of the IQ data at a desired signal type, a channel, or a reception status level, depending on the setting of the trigger condition.

The measuring device according to claim 2 of the present invention can be configured such that the predetermined section according to the predetermined timing has a starting point before the predetermined timing.

With this configuration, the measuring device according to claim 2 of the present invention can extract, as an analysis target, IQ data in a predetermined section starting from a time point before it is determined that the trigger condition is satisfied, and can reliably analyze the IQ data under the reception status satisfying the trigger condition.

The measuring device according to claim 3 of the present invention further includes a storage unit (15) that stores the signal data calculated by the signal data calculation unit in a ring buffer memory, in which the signal extraction unit may extract signal data in the predetermined section from the signal data stored in the ring buffer memory.

With this configuration, the measuring device according to claim 3 of the present invention can always secure the latest fixed amount of signal data among the signal data sequentially calculated by the signal data calculation unit in the ring buffer memory, and reliably extract IQ data in a predetermined section starting from a time point before it is determined that the trigger condition is satisfied.

In the measuring device according to claim 4 of the present invention, the signal data extracted by the signal extraction unit is signal data of a physical layer, and the trigger signal is output when the predetermined trigger condition is either ULSCH, UCI (SR), UCI (CSI), UCI (HARQ-ACK), PRACH or SRS, a total received power (total Power) is equal to or higher than a predetermined threshold, and the reception status is DTX, CRC NG, CRC OK, Decode NG, or Decode OK.

With this configuration, the measuring device according to claim 4 of the present invention can implement detailed analysis of IQ data at the reception status level such as DTX, CRC NG, CRC OK, or Decode NG, Decode OK for ULSCH, UCI (SR), UCI (CSI), UCI (HARQ-ACK), PRACH, SRS, or the like which are related to communication at the physical layer, depending on the setting of a predetermined trigger condition.

In the measuring device according to claim 5 of the present invention, the signal data extracted by the signal extraction unit is signal data of a physical layer, and the trigger condition is managed in accordance with a pseudo base station that simulates communication with the mobile terminal, and includes a period (act time) for activating a communication operation of the pseudo base station.

With this configuration, the measuring device according to claim 5 of the present invention operates to receive the signal to be measured at a timing managed by the pseudo base station by setting a predetermined act time as a predetermined trigger condition, and can reliably analyze the IQ data included in the signal to be measured at that time.

The measuring device according to claim 6 of the present invention may have a configuration in which the signal extraction unit and the IQ data analysis unit are connected by a wired cable.

With this configuration, the measuring device according to claim 6 of the present invention can connect the same type of measuring devices in parallel when the number of base stations further increases, and can cope with the case where the signals to be transmitted and received increase.

In order to solve the above problems, a measuring method according to claim 7 of the present invention is a measuring method for measuring a signal to be measured received from a mobile terminal (70) that transmits and receives radio frequency signals by using a measuring device (1) that tests the operation of the communication function of the mobile terminal by performing communication simulating a base station with the mobile terminal (70), and includes a trigger condition acquisition step (S11) of acquiring an arbitrary channel of a physical layer used for receiving the signal to be measured, and a predetermined trigger condition in which the reception status of the signal to be measured in the channel is designated, a reception step (S12) of receiving the signal to be measured from the mobile terminal (70), a signal data calculation step (S13) of converting the signal to be measured into a digital signal and calculating signal data, a trigger signal output step (S17) of outputting a trigger signal at a predetermined timing when a predetermined trigger condition is satisfied, a signal extraction step (S18) of receiving the trigger signal and extracting IQ data in a predetermined section according to a predetermined timing from the signal data, and an IQ data analysis step (S19) of analyzing the extracted IQ data.

With this configuration, the measuring method according to claim 7 of the present invention can acquire IQ data in a predetermined section of the signal to be measured and analyze the IQ data only under a communication state satisfying the trigger condition, and can support a detailed analysis process of the IQ data at a desired signal type, a channel, or a reception status level, depending on the setting of the trigger condition.

Advantage of the Invention

According to the present invention, it is possible to provide a measuring device and a measuring method capable of setting conditions including a signal type, a channel, and a reception status, and performing detailed analysis of IQ data corresponding to a communication state satisfying the conditions.

BRIEF DESCRIPTION OF THE DRAWINGS

FIG. 5A is a conceptual diagram showing a timing relationship between the start and end of storage of IQ data and a trigger signal in the ring buffer memory, and FIG. 5B shows the timing of the trigger signal in the storage range of the IQ data.

FIG. 8 is a block diagram showing a configuration of a measuring device according to a second embodiment of the present invention.

BEST MODE FOR CARRYING OUT THE INVENTION

Hereinafter, embodiments of a measuring device and a measuring method according to the present invention will be described with reference to the drawings.

FIRST EMBODIMENT

In the first embodiment, an example in which the measuring device of the present invention is applied to a base station simulator that tests a mobile terminal by simulating a base station will be described. First, the configuration of the base station simulator in the first embodiment will be described.

Figure 1:
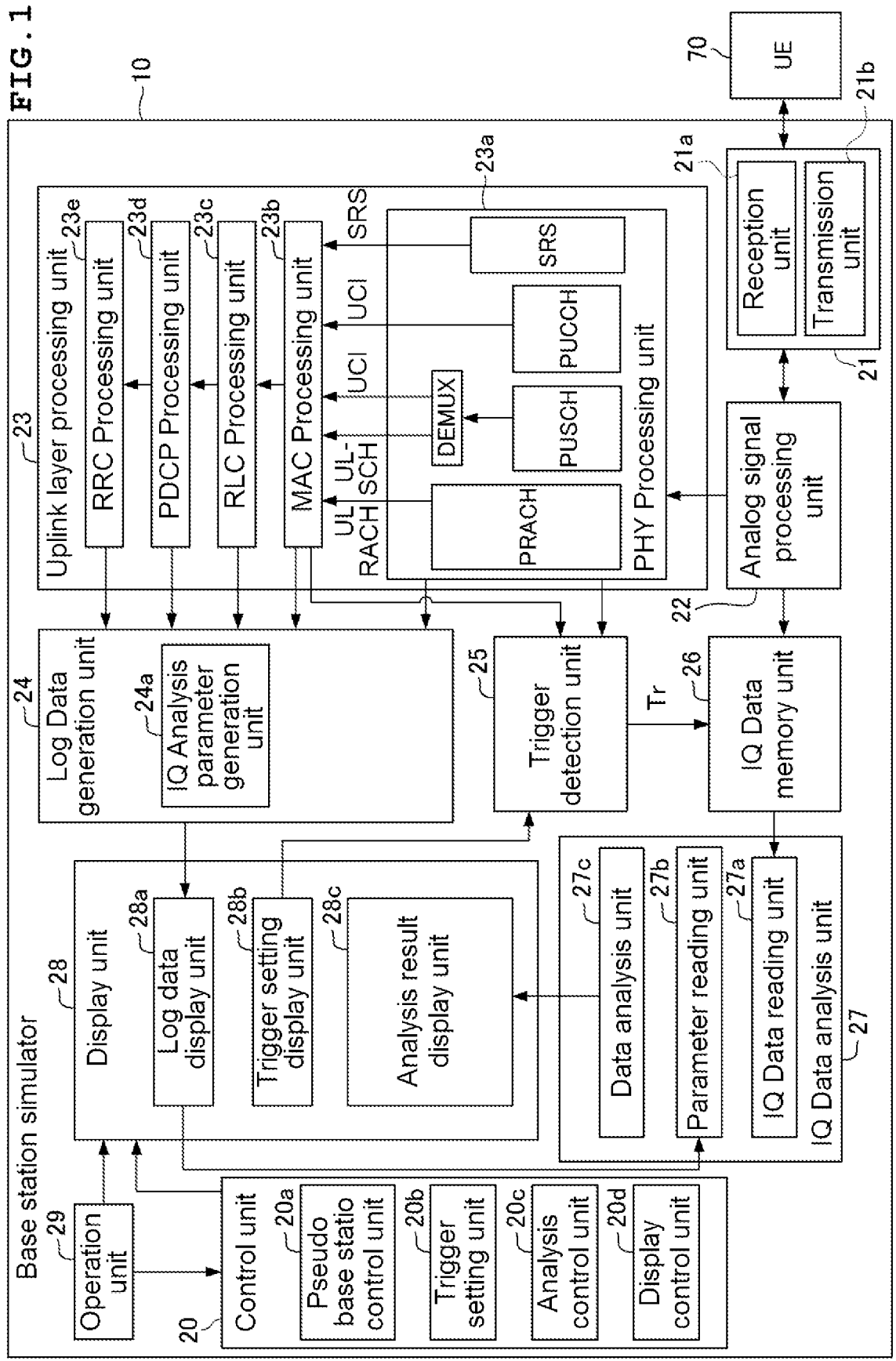
FIG. 1 is a block configuration diagram of a base station simulator according to a first embodiment of the present invention.

As shown in FIG. 1, a base station simulator 10 in the present embodiment tests the communication function of a mobile terminal (User Equipment (UE)) 70 by transmitting and receiving radio frequency signals to and from the UE 70. The UE 70 is a terminal such as a mobile phone or a mobile terminal that transmits and receives a radio frequency signal corresponding to a predetermined communication standard, for example, a communication standard called 5G NR.

The base station simulator 10 includes a control unit 20, a transmission/reception unit 21, an analog signal processing unit (signal data calculation unit) 22, an uplink layer processing unit 23, a log data generation unit 24, a trigger detection unit 25, an IQ data memory unit 26, an IQ data analysis unit 27, a display unit 28, and an operation unit 29. The base station simulator 10 includes a microcomputer (not shown) including a CPU, a ROM, a RAM, FPGA, an input/output circuit to which various interfaces are connected, and the like. That is, the base station simulator 10 causes the microcomputer to function as a base station simulator for testing the UE 70 by executing a control program stored in advance in the ROM. The base station simulator 10 constitutes a measuring device according to the present invention.

The control unit 20 is a function unit that controls the entire base station simulator 10, and includes a pseudo base station control unit 20a, a trigger setting unit 20b, an analysis control unit 20c, and a display control unit 20d. The pseudo base station control unit 20a is a control means for managing a plurality of pseudo base stations, transmits a radio frequency signal simulating each pseudo base station to the UE 70 according to a preset test scenario, receiving a radio frequency signal (signal to be measured) transmitted from the UE 70 that has received the radio frequency signal, and analyzing signal data included in the signal to be measured to execute a test for evaluating the communication function of the UE 70.

The trigger setting unit 20b performs control to set a condition for instructing the acquisition (storage) timing of the signal data to be analyzed among the signal data (IQ data) calculated from the received signal to be measured. When the communication state satisfying this condition is entered, the trigger signal is output from the trigger detection unit 25 described later. The above conditions set by the trigger setting unit 20b are hereinafter referred to as trigger conditions.

The analysis control unit 20c executes analysis control for analyzing the IQ data (calculated by the analog signal processing unit 22) stored in the IQ data memory unit 26 by receiving the trigger signal. The display control unit 20d performs display control for displaying various types of information such as IQ data analysis results on the display unit 28.

The reception unit 21a is a function unit that is provided corresponding to the uplink path in which the UE 70 transmits a signal (signal to be measured) to the base station simulator 10, and receives the radio frequency signal which is the signal (uplink data).

A transmission unit 21b is provided corresponding to a downlink path in which the UE 70 receives a signal from the base station simulator 10. The transmission unit 21b transmits the baseband data (hereinafter, simply referred to as "IQ data") of an I-phase component (in-phase component) and a Q-phase component (orthogonal component) which are downlink data generated by a base station simulation calculation unit (not shown) described later under the control of the pseudo base station control unit 20a of the control unit 20 to the UE 70. When the UE 70 receives the baseband data transmitted from the transmission unit 21b, the UE 70 transmits the baseband data as a response signal to the reception to the base station simulator 10 as the above-described signal to be measured.

The transmission/reception unit 21 is composed of the transmission unit 21b and the reception unit 21a. The transmission/reception unit 21 communicates with the UE 70 via a Radio Frequency (RF) signal.

The analog signal processing unit 22 is an arithmetic processing function unit that receives an RF signal including uplink data from the UE 70, received by the reception unit 21a, as a signal to be measured, converts the signal to be measured from an analog signal to a digital signal, and performs a decoding process to calculate IQ data. The analog signal processing unit 22 constitutes the signal data calculation unit of the present invention together with the uplink layer processing unit 23 to be described later.

The uplink layer processing unit 23 is a part that performs signal processing of each layer of signal data calculated by the analog signal processing unit 22. The uplink layer processing unit 23 includes a PHY processing unit 23a that processes a Physical Layer (PHY layer), a MAC processing unit 23b that processes a Medium Access Control Layer (MAC layer) above the PHY layer, an RLC processing unit 23c that processes a Radio Link Control Layer (RLC layer) above the MAC layer, a PDCP processing unit 23d that processes a Packet Data Convergence Protocol Layer (PDCP layer) above the RLC layer, and an RRC processing unit 23e that processes a Radio Resource Control Layer (RRC layer) above the PDCP layer.

In the uplink layer processing unit 23, the PHY processing unit 23a performs signal processing in the PHY layer on the signal data input from the analog signal processing unit 22, and inputs the signal data to the MAC processing unit 23b. Examples of physical layer level channels, control information, and reception status information related to signal processing in the PHY layer are shown below.

First, channels include UpLink-Random Access CHannel (UL-RACH), UpLink Shared CHannel (uplink data channel (UL-SCH)), Physical Random Access CHannel (physical channel for random access (PRACH)), Physical Uplink Shared CHannel (PUSCH), Physical Uplink Control CHannel (PUCCH) and the like.

As the control information, Uplink Control Information (UCI), Scheduling Request (SR), Channel State Information (CSI), Hybrid Automatic Repeat reQuest ACKnowledgement (request response signal (HARQ-ACK)), Sounding Reference Signal (SRS) and the like are used. Further, UCI (SR), which is a UCI in which SR is inserted, UCI (CSI), which is a UCI in which CSI is inserted, and UCI (HARQ-ACK), which is a UCI in which HARQ-ACK is inserted, are also used.

In addition, reception status information includes Discontinuous Transmission (voice signal non-input state information (DTX)), Cyclic Redundancy Check (redundancy check code for error detection (CRC)) failure information (CRC NG), CRC success information (CRC OK), decoding failure information (Decode NG), decoding success information (Decode OK) and the like.

It is disclosed that the PHY processing unit 23a shown in FIG. 1 has a configuration capable of processing the above-described channel, control information, and reception status information. Further, a configuration is also disclosed in which the PHY processing unit 23a has a demultiplexer (DEMUX) and the uplink data from the PUSCH is separated into two parts, UL-SCH and UCI, and transmitted.

Since the PHY processing unit 23a has a configuration capable of processing the above-described channel, control information, and reception status information, the base station simulator 10 can perform tests according to various test scenarios such as the following test scenarios 1 to 3.

Test scenario 1: The pseudo base station transmits a test signal as downlink data to the UE 70, and the UE 70 responds, for example, with UCI (SR), UCI (CSI), and UCI (HARQ-ACK).

Test scenario 2: The pseudo base station transmits a test signal as downlink data to the UE 70, and grasps the reception status from the response with, for example, either DTX, CRC NG, CRC OK, or Decode NG, and Decode OK from the UE 70.

Test scenario 3: Perform tests based on test scenarios 1 and 2 at each channel level.

The MAC processing unit 23b processes each processing signal of the PHY layer input from the PHY processing unit 23a as a signal of the MAC layer, and passes the processed signal to the RLC processing unit 23c. The RLC processing unit 23c processes each processing signal of the MAC layer input from the MAC processing unit 23b as a signal of the RLC layer, and passes the processed signal to the PDCP processing unit 23d. The PDCP processing unit 23d processes each processing signal of the PLC layer input from the RLC processing unit 23c as a signal of the PDCP layer, and passes the processed signal to the RRC processing unit 23e. The RRC processing unit 23e processes each processing signal of the PDCP layer input from the PDCP processing unit 23d as a signal of the PRC layer.

In the uplink layer processing unit 23, the signal of each layer processed by the PHY processing unit 23a, the MAC processing unit 23b, the RLC processing unit 23c, the PDCP processing unit 23d, and the RRC processing unit 23e is transmitted to the log data generation unit 24. Of these, the signal of each layer processed by the PHY processing unit 23a and the MAC processing unit 23b is also is transmitted to the trigger detection unit 25.

In this way, the uplink layer processing unit 23 is configured to perform a communication protocol process of each layer in accordance with a predetermined communication standard, processes the signal data from the analog signal processing unit 22 to output the signal data to the log data generation unit 24, and outputs the signal data of the PHY layer and the MAC layer to the trigger detection unit 25.

The log data generation unit 24 generates log data from the signal data output from the uplink layer processing unit 23. The log data generated by the log data generation unit 24 includes time information and identifier information. The log data generated by the log data generation unit 24 is stored in a log data storage unit (not shown) composed of a large-capacity storage medium such as a hard disk drive (HDD) or a flash memory, for example.

The log data generation unit 24 has an IQ analysis parameter generation unit 24a. The IQ analysis parameter generation unit 24a generates IQ analysis parameters based on the signal data generated as described above, and transmits the generated IQ analysis parameters to a log data display unit 28a described later.

The trigger detection unit 25 has a function of monitoring the communication state involved in the above-described channels, control information and reception status information of the PHY layer and the MAC layer, based on the signal data of the PHY layer and the MAC layer input from the PHY processing unit 23a and the MAC processing unit 23b of the uplink layer processing unit 23, and determining (detecting) whether or not a communication state satisfies a preset trigger condition. The trigger condition is composed of, for example, a channel, a signal (for example, limited to the PHY layer and the MAC layer) type, and a reception status to be analyzed. The trigger condition can be set for each cell of a plurality of pseudo base stations (cells) under the control of the pseudo base station control unit 20a provided in the control unit 20, for example. The trigger condition is set, under the control of the trigger setting unit 20b constituting the control unit 20, by using the setting screen displayed on a trigger setting display unit 28b of the display unit 28 described later.

Among the information constituting the trigger condition, the cell to be analyzed can be selectively designated from the plurality of pseudo base stations (cells) under the control of the pseudo base station control unit 20a. As the signal or channel to be analyzed, any one of ULSCH, UCI (SR), UCI (CSI), UCI (HARQ-ACK), PRACH or SRS can be selectively designated from the channels or control information described in the explanation of the configuration of the PHY processing unit 23a. Further, the reception status can also be selectively designated from the above-described DTX, CRC NG, CRC OK, Decode NG, or Decode OK. The trigger condition may further include the total received power (total Power) of the signal to be analyzed.

The trigger detection unit 25 has a function of transmitting a trigger signal instructing to store the signal data under the communication state in the IQ data memory unit 26, when detecting that a communication state satisfying the trigger condition has occurred. The trigger detection unit 25 constitutes the trigger signal output unit of the present invention.

The IQ data memory unit 26 stores signal data calculated by the analog signal processing unit 22, and is composed of, for example, a ring buffer memory. When the trigger signal is input from the trigger detection unit 25, the IQ data memory unit 26 stores the signal data (IQ data) calculated by the analog signal processing unit 22 in the ring buffer memory.

Figure 5A:
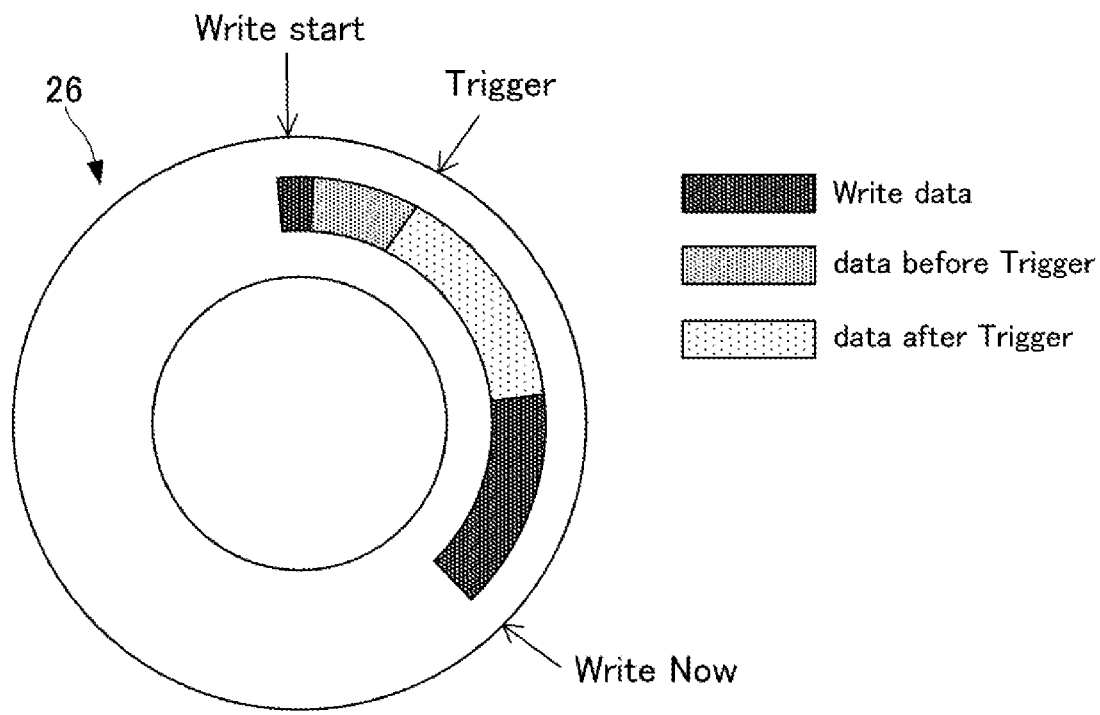
FIGS. 5A and 5B are conceptual diagrams for explaining an acquisition image of IQ data using a ring buffer memory of the base station simulator according to the first embodiment of the present invention.

Since the IQ data memory unit 26 is composed of a ring buffer memory, when the trigger is set, for example, as shown in FIG. 5A, writing of IQ data to the buffer memory is started before the trigger signal is generated (input), and when the trigger signal is generated (input), the writing of the IQ data is stopped within the range that does not overwrite the previous data in the designated range. With such a structure, the IQ data memory unit 26 can acquire IQ data before the trigger signal is generated.

Figure 5B:
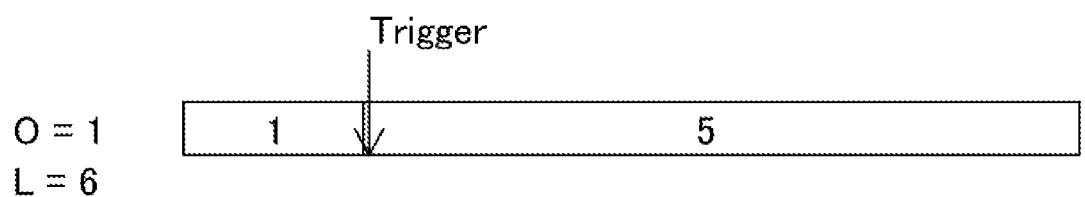

Here, the range of IQ data acquired from the timing when the trigger signal is generated is determined based on, for example, the time before the trigger signal (Trigger Offset O) and the data acquisition time (Data length L), as shown in FIG. 5B. FIG. 5B shows an example in which the ratio of Trigger Offset O to Data length L is 1:6, and IQ data corresponding to the data acquisition time (Data length L) and the addition time of 5 times the data acquisition time is acquired. As described above, the IQ data memory unit 26 has a function of receiving a trigger signal and extracting IQ data in a predetermined section according to a predetermined timing from the signal data, and constitutes the signal extraction unit of the present invention. Further, the IQ data memory unit 26 stores the signal data calculated by the analog signal processing unit 22 in the ring buffer memory, and constitutes the storage unit of the present invention.

The IQ data analysis unit 27 is a processing function unit that analyzes and processes IQ data stored in the IQ data memory unit 26 under the control of the analysis control unit 20c, and includes an IQ data reading unit 27a, a parameter reading unit 27b, and data analysis unit 27c. The IQ data reading unit 27a performs a process of reading IQ data stored in the IQ data memory unit 26. The parameter reading unit 27b executes a process of reading the IQ analysis parameters generated by the IQ analysis parameter generation unit 24a of the log data generation unit 24 in accordance with the IQ data reading by the IQ data reading unit 27a. The data analysis unit 27c executes a process of analyzing the IQ data read from the IQ data memory unit 26 based on the IQ analysis parameters. The IQ data analysis unit 27 and the IQ data memory unit 26 are preferably connected by a wired cable. The IQ data analysis unit 27 constitutes the IQ data analysis unit of the present invention.

The display unit 28 includes a log data display unit 28a, a trigger setting display unit 28b, and an analysis result display unit 28c. The log data display unit 28a is a part that displays a display screen for displaying a log, and the trigger setting display unit 28b is a part that displays a setting screen 30 (see FIG. 2) for setting a trigger condition, and the analysis result display unit 28c is a part that displays analysis result screens 40a (see FIG. 6) and 40b (see FIG. 7).

In the control unit 20, the display control unit 20d generates a display screen for displaying the log, reads the log data from the log data storage unit according to the operation content of the operation unit 29, and displays the log based on the information included in the log data on the log data display unit 28a. The display control unit 20d also generates the setting screen 30 (see FIG. 2) for setting the trigger condition, reads the setting screen 30 according to the operation content of the operation unit 29, and displays the setting screen 30 on the trigger setting display unit 28b. Further, the display control unit 20d generates the analysis result screens 40a and 40b (see FIGS. 6 and 7) for displaying the analysis result of the IQ data by the IQ data analysis unit 27, reads the analysis result screens 40a and 40b according to the operation contents of the operation unit 29, and displays the analysis result screens 40a and 40b on the analysis result display unit 28c.

The operation unit 29 is composed of an input device such as a keyboard, dial or mouse, a display for displaying test conditions, control circuits and software for controlling these, and is operated by the examiner to input each test condition, and set display contents of the display unit 28.

The operation of the base station simulator 10 having the above-described configuration will be described below. As described above, in the base station simulator 10, in the test performed according to the test scenario under the control of the pseudo base station control unit 20a, the RF signal (signal to be measured) including the uplink data from the UE 70 is received by the reception unit 21a, and the signal data including the IQ data is calculated by the signal processing in the analog signal processing unit 22.

The signal data calculated by the analog signal processing unit 22 is input to the uplink layer processing unit 23 and subjected to signal processing of each layer, and the signal data after signal processing of the PHY layer and the MAC layer is input to the trigger detection unit 25. The signal data (IQ data) calculated by the analog signal processing unit 22 is also input to the IQ data memory unit 26.

In the base station simulator 10 having such an uplink signal processing function, in order to analyze the signal data input from the analog signal processing unit 22 to the IQ data memory unit 26, it is necessary to set the trigger condition for issuing the trigger signal that activates the acquisition operation of the IQ data to be analyzed in the IQ data memory unit 26.

Figure 3:
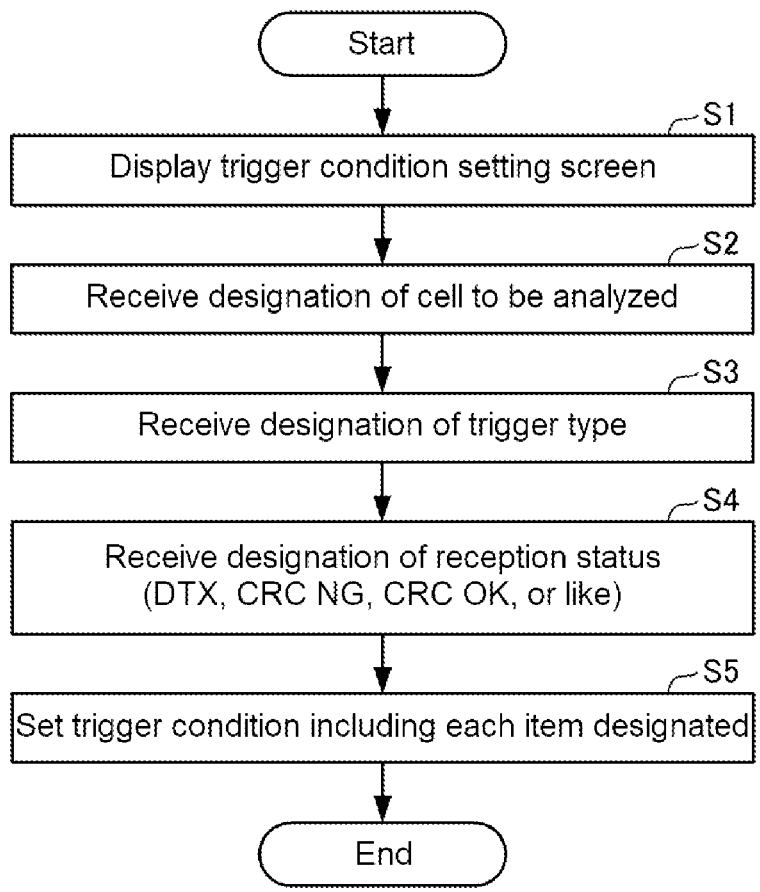
FIG. 3 is a flowchart showing a trigger condition setting processing operation in the base station simulator according to the first embodiment of the present invention.

The trigger condition setting processing operation in the base station simulator 10 will be described with reference to the flowchart shown in FIG. 3.

In order to set the trigger condition in the base station simulator 10, first, the operation unit 29 performs a predetermined trigger setting start operation. By this trigger setting start operation, the trigger setting unit 20b causes the trigger setting display unit 28b of the display unit 28 to display the trigger condition setting screen 30 (step S1).

Figure 2:
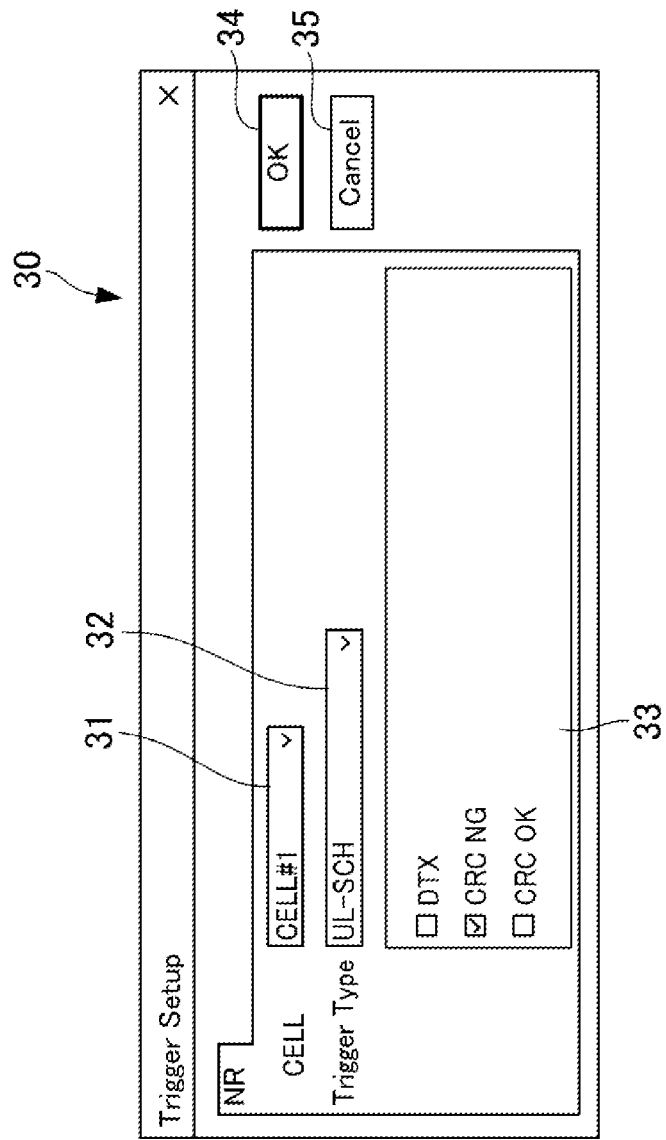
FIG. 2 is a diagram showing a configuration example of a trigger condition setting screen in the base station simulator according to the first embodiment of the present invention.

As shown in FIG. 2, the setting screen 30 includes, for example, a cell designation tool 31, a trigger type designation tool 32, a reception status designation tool 33, an OK button 34, and a cancel button 35. The cell designation tool 31 is for selectively designating a pseudo base station (cell) to be analyzed for IQ data. The trigger type designation tool 32 is for selectively designating the signal type (trigger type) to be analyzed. The reception status designation tool 33 is for selectively designating the communication state (reception status) of the signal to be analyzed. The OK button 34 is a tool for instructing the start of setting, and the cancel button 35 is a tool for instructing cancellation of the setting.

After the setting screen 30 is displayed in step S1, the trigger setting unit 20b receives the designation of the cell to be analyzed by the cell designation tool 31 on the setting screen 30 (step S2). The cell option is all pseudo base stations under the control of the pseudo base station control unit 20a.

Next, the trigger setting unit 20b receives the designation of the trigger type by the trigger type designation tool 32 on the setting screen 30 (step S3). The trigger type option is, for example, either ULSCH, UCI (SR), UCI (CSI), UCI (HARQ-ACK), PRACH or SRS.

Subsequently, the trigger setting unit 20b receives the designation of the reception status of the signal to be analyzed by the reception status designation tool 33 on the setting screen 30 (step S4). Examples of the communication state options include DTX, CRC NG, CRC OK, or Decode NG, Decode OK and the like.

Further, the trigger setting unit 20b monitors whether or not the OK button 34 on the setting screen 30 is pressed, and when the OK button 34 is pressed, the trigger setting unit 20b sets the trigger condition including each item designated in the above steps S2 to S4 (step S5), and completes a series of trigger condition setting processes.

FIG. 2 shows a display example of the setting screen 30 at the time of setting a trigger condition in which the cell to be analyzed is a cell having an identifier of "CELL #1", the trigger type is "UL-SCH", and the reception status is "CRC NG".

The trigger condition set as described above is passed from the trigger setting unit 20b to the trigger detection unit 25. The trigger detection unit 25 monitors whether or not the communication state satisfies the trigger condition acquired from the trigger setting unit 20b. When it is detected that the communication state satisfies the trigger condition, the trigger detection unit 25 outputs a trigger signal to the IQ data memory unit 26 at a predetermined timing.

According to the trigger condition set on the setting screen 30 shown in FIG. 2, the base station simulator 10 outputs the trigger signal when the signal data using the UL-SCH of the uplink data from the UE 70 is CRC NG, in the simulated communication between the cell having the identifier of "CELL #1" and the UE 70.

When the IQ data memory unit 26 receives the trigger signal, the IQ data memory unit 26 acquires (stores) IQ data in a predetermined section (corresponding to the predetermined timing) as an analysis target from the signal data calculated by the analog signal processing unit 22. Then, the IQ data analysis unit 27 executes the analysis process on the IQ data stored in the IQ data memory unit 26.

Next, the IQ data analysis processing operation in the base station simulator 10 will be described with reference to the flowchart shown in FIG. 4. Here, it is assumed that the base station simulator 10 performs the test of the UE 70 according to the test scenario under the control of the pseudo base station control unit 20a and transmit and receive a radio frequency signal to and from the UE 70. It is premised that the IQ data analysis process in the base station simulator 10 is performed on the uplink data transmitted from the UE 70 to the base station simulator 10 in the test.

In performing the IQ data analysis process, the trigger detection unit 25 acquires and holds the trigger condition set by the trigger setting unit 20b (step S11).

After that, when the test of the UE 70 is started under the control of the pseudo base station control unit 20a, the radio frequency signal is transmitted and received to and from the UE 70, and the uplink data from the UE 70 is received by the reception unit 21a (step S12), and is input to the analog signal processing unit 22.

Next, the analog signal processing unit 22 receives the uplink data input from the reception unit 21a as a signal to be measured, converts the signal to be measured from an analog signal to a digital signal, and executes an arithmetic process for calculating signal data (IQ data) (step S13).

The signal data calculated by the arithmetic process in step S13 is transmitted to the uplink layer processing unit 23 and the IQ data memory unit 26 (step S14).

The uplink layer processing unit 23 sequentially performs the processes of the PHY layer, the MAC layer, the RLC layer, the PDCP layer, and the RRC layer on the signal data from the analog signal processing unit 22 (step S15). Then, the processed signal data is transmitted to the log data generation unit 24, and the signal data of the PHY layer and the MAC layer is transmitted to the trigger detection unit 25.

The trigger detection unit 25 collates the input signal data of the PHY layer and the MAC layer with the trigger condition that has already been acquired (see step S11), and determines whether or not the communication state of the signal data satisfies the trigger condition (step S16). In a case where it is determined that the communication state of the signal data does not satisfy the trigger condition (NO in step 16), the processes of step S12 and subsequent steps are continued.

On the other hand, in a case where it is determined that the communication state of the signal data satisfies the trigger condition (YES in step 16), the trigger detection unit 25 outputs the trigger signal to the IQ data memory unit 26 at a predetermined timing (step S17).

The IQ data memory unit 26 is composed of a ring buffer memory having a predetermined storage capacity, and always stores (secures) the latest signal data of the above storage capacity among the signal data input from the analog signal processing unit 22. When the IQ data memory unit 26 receives the trigger signal output by the trigger detection unit 25, the IQ data memory unit 26 extracts IQ data in a predetermined section corresponding to the predetermined timing described above from the secured signal data (step S18).

Next, in the IQ data analysis unit 27, the IQ data reading unit 27a reads IQ data in a predetermined section from the IQ data memory unit 26, and the data analysis unit 27c executes an analysis process of the read IQ data (step S19). Here, the data analysis unit 27c analyzes the read IQ data, based on the IQ analysis parameters read from the log data by the parameter reading unit 27b.

Figure 6:
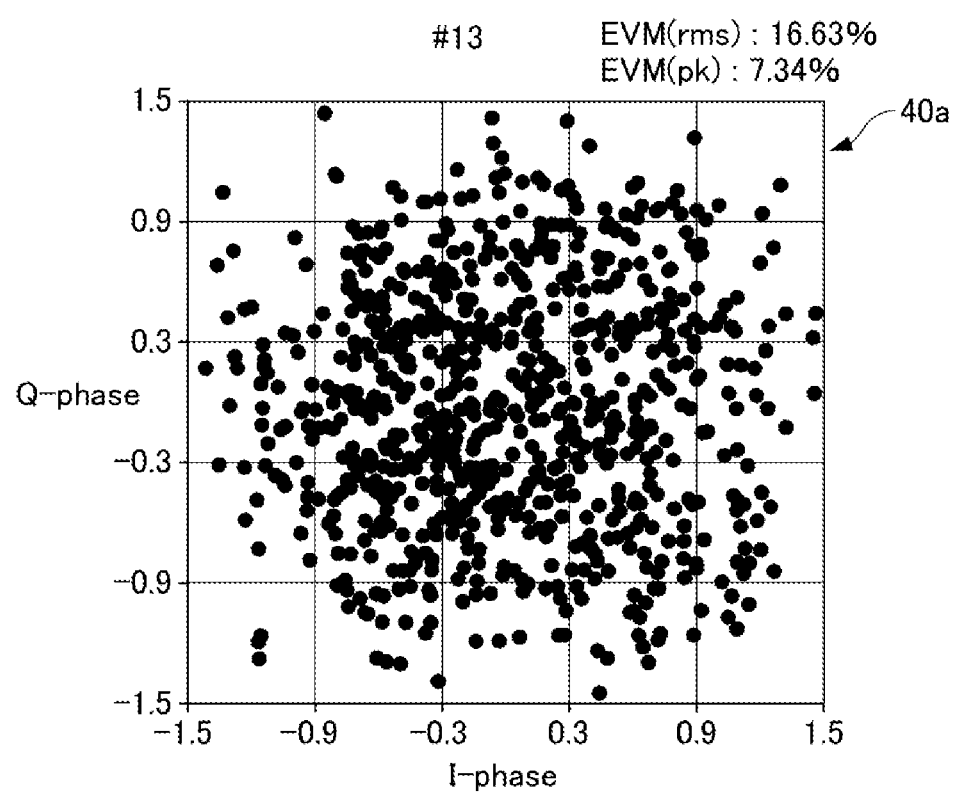
FIG. 6 is a diagram showing a display example of IQ data analysis results when the reception status of the trigger condition of the base station simulator according to the first embodiment of the present invention is set to CRC NG.
Figure 7:
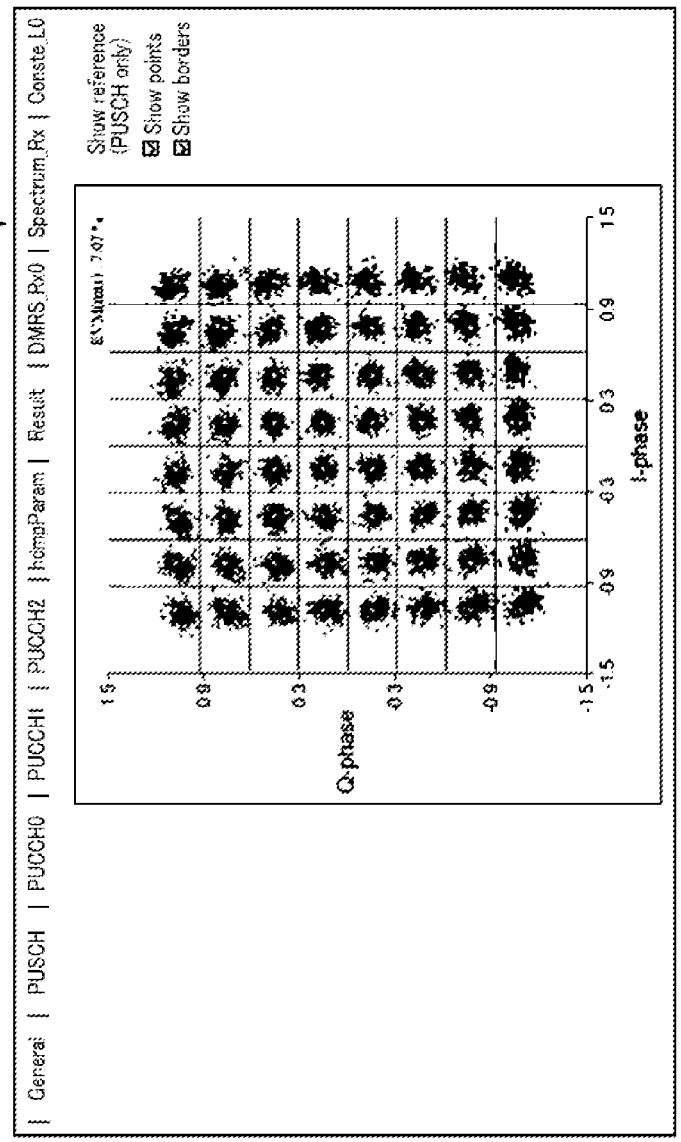
FIG. 7 is a diagram showing a display example of IQ data analysis results when the reception status of the trigger condition of the base station simulator according to the first embodiment of the present invention is set to CRC OK.

During the execution of the IQ data analysis process in step S19, the display control unit 20d executes a control for displaying the analysis result of the IQ data by the data analysis unit 27c on the analysis result display unit 28c. FIGS. 6 and 7 show display examples of IQ data analysis results on the analysis result display unit 28c. In both the analysis result screen 40a shown in FIG. 6 and the analysis result screen 40b shown in FIG. 7, a so-called constellation display form in which points corresponding to each measured value of the signal to be measured (multi-level quadrature modulation signal) are arranged on the IQ coordinate plane is adopted.

The analysis result screen 40a shown in FIG. 6 shows, for example, a display example of the analysis result of IQ data corresponding to the case where the reception status is set to a value corresponding to the communication failure such as "CRC NG", for example, in the setting of the trigger condition using the setting screen 30 shown in FIG. 2. According to the constellation display form of the analysis result screen 40a, the points corresponding to the measured values on the IQ coordinate plane are observed to be present at positions significantly deviated from the ideal measurement points of the multi-level quadrature modulation signal.

The analysis result screen 40b shown in FIG. 7 shows, for example, a display example of the analysis result of IQ data corresponding to the case where the reception status is set to a value corresponding to the communication success such as "CRC OK", for example, in the setting of the trigger condition using the setting screen 30 shown in FIG. 2. According to the constellation display form of the analysis result screen 40b, the points corresponding to the measured values on the IQ coordinate plane are observed to be present at positions close to the ideal measurement points of the multi-level quadrature modulation signal.

When the IQ data analysis process in step S19 is completed, the pseudo base station control unit 20a performs controls to end the series of IQ data analysis processes.

Figure 4:
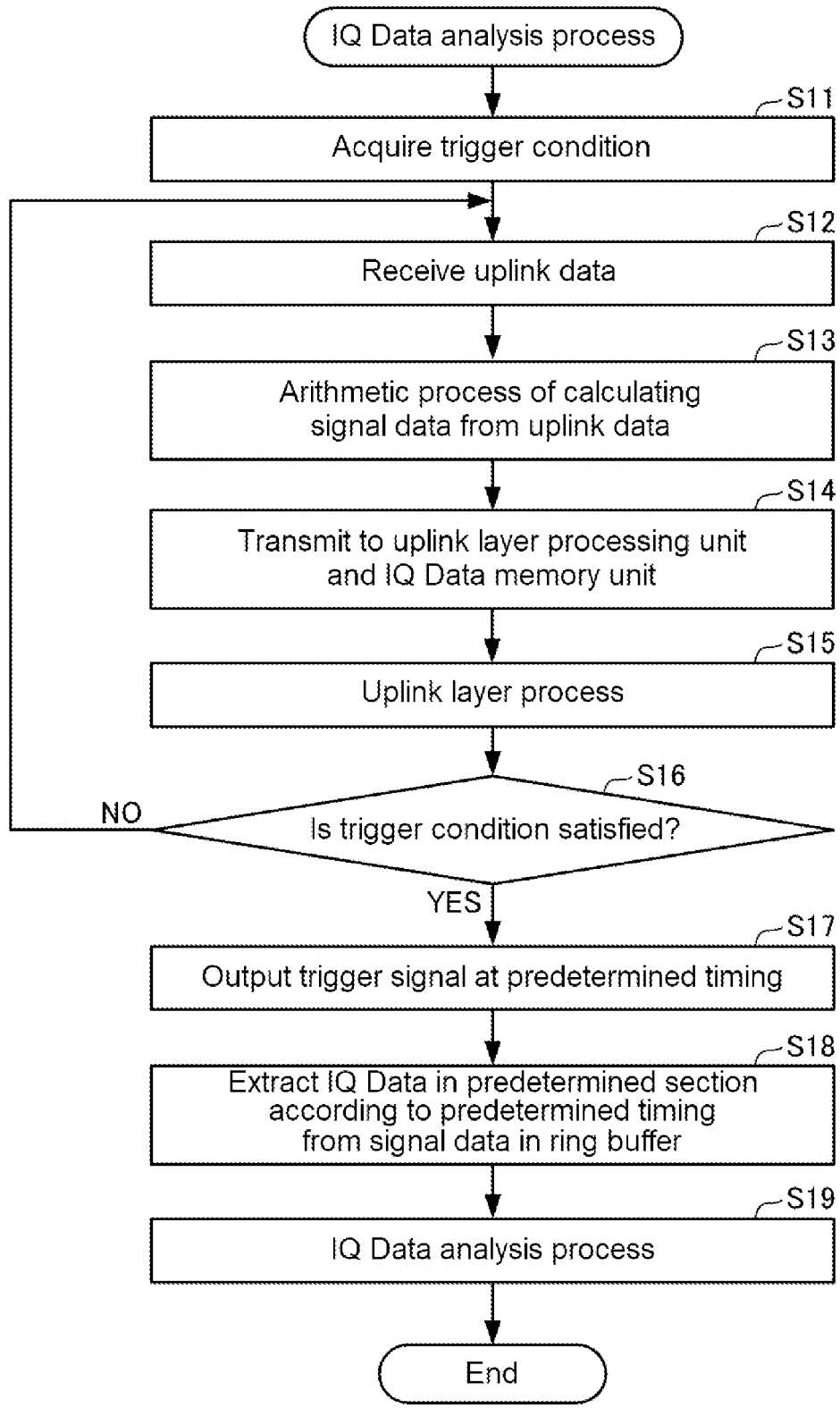
FIG. 4 is a flowchart showing an IQ data analysis processing operation in the base station simulator according to the first embodiment of the present invention.

According to the base station simulator 10 that sets the trigger condition by using the setting screen 30 shown in FIG. 2 and executes the IQ data analysis process according to the flowchart shown in FIG. 4, regarding the signal processing of the PHY layer of the uplink data from the UE 70, it becomes possible to analyze IQ data according to the above-described test scenarios 1 to 3 and the like.

The present embodiment illustrates an example in which the signal data (the signal stored corresponding to the output of the trigger signal) extracted by the IQ data memory unit 26 is the signal data of the physical layer (PHY layer) and the trigger condition set by the trigger setting unit 20b is contents including the trigger type and the reception status, but the present invention is not limited to this. For example, the trigger condition may be the information form including the information managed in accordance with each pseudo base station under the control of the pseudo base station control unit 20a, for example, the act time (the period for activating the communication operation of the pseudo base station).

As described above, the base station simulator 10 according to the present embodiment includes a reception unit 21a that receives a signal to be measured transmitted from the UE 70, an analog signal processing unit 22 that converts the signal to be measured into a digital signal and calculates signal data, a trigger detection unit 25 that outputs a trigger signal at a predetermined timing when a predetermined trigger condition is satisfied, an IQ data memory unit 26 that receives the trigger signal and extracts IQ data in a predetermined section according to a predetermined timing from the signal data, and an IQ data analysis unit 27 that analyzes the extracted IQ data.

With this configuration, the base station simulator 10 according to the present embodiment can acquire IQ data in a predetermined section of the signal to be measured and analyze the IQ data only under a communication state satisfying the trigger condition, and can support a detailed analysis process of the IQ data at a desired signal type, channel, or reception status level, depending on the setting of the trigger condition.

Further, the base station simulator 10 according to the present embodiment has a configuration in which a predetermined section according to a predetermined timing starts before the predetermined timing. With this configuration, the base station simulator 10 according to the present embodiment can extract, as an analysis target, IQ data in a predetermined section starting from a time point before it is determined that the trigger condition is satisfied, and can reliably analyze the IQ data under the reception status satisfying the trigger condition.

Further, the base station simulator 10 according to the present embodiment further includes an IQ data memory unit 26 that stores the signal data calculated by the analog signal processing unit 22 in a ring buffer memory, and the IQ data memory unit 26 extracts signal data in a predetermined section from the signal data stored in the ring buffer memory.

With this configuration, the base station simulator 10 according to the present embodiment can always secure the latest fixed amount of signal data among the signal data sequentially calculated by the analog signal processing unit 22 in the ring buffer memory, and reliably extract IQ data in a predetermined section starting from a time point before it is determined that the trigger condition is satisfied.

Further, the base station simulator 10 according to the present embodiment has a configuration to output a trigger signal when the signal data extracted by the IQ data memory unit 26 is the signal data of the physical layer, and the predetermined trigger condition is either ULSCH, UCI (SR), UCI (CSI), UCI (HARQ-ACK), PRACH or SRS, the total received power (total Power) is equal to or higher than a predetermined threshold, and the reception status is DTX, CRC NG, CRC OK, Decode NG, or Decode OK.

With this configuration, the base station simulator according to the present embodiment can implement detailed analysis of IQ data at the reception status level such as DTX, CRC NG, CRC OK, or Decode NG, Decode OK for ULSCH, UCI (SR), UCI (CSI), UCI (HARQ-ACK), PRACH, SRS, or the like which are related to communication at the physical layer, depending on the setting of a predetermined trigger condition.

Further, in the base station simulator 10 according to the present embodiment, the signal data extracted by the IQ data memory unit 26 is the signal data of the physical layer, and the trigger condition is managed in accordance with a pseudo base station that simulates communication with the UE 70, and includes a period (act time) for activating the communication operation of the pseudo base station.

With this configuration, the base station simulator 10 according to the present embodiment operates to receive the signal to be measured at a timing managed by the pseudo base station by setting a predetermined act time as a predetermined trigger condition, and can reliably analyze the IQ data included in the signal to be measured at that time.

Further, the measuring method according to the present embodiment is a measuring method for measuring a signal to be measured received from a UE 70 by using a measuring device 1 (or a base station simulator 10) that tests the operation of the communication function of the UE 70 by performing communication simulating a base station with the UE 70 that transmits and receives radio frequency signals, and includes a trigger condition acquisition step (S11) of acquiring an arbitrary channel of a physical layer used for receiving the signal to be measured, a predetermined trigger condition in which the reception status of the signal to be measured in the channel is designated, a reception step (S12) of receiving the signal to be measured from the UE 70, a signal data calculation step (S13) of converting the signal to be measured into a digital signal and calculating signal data, a trigger signal output step (S17) of outputting a trigger signal at a predetermined timing when a predetermined trigger condition is satisfied, a signal extraction step (S18) of receiving the trigger signal and extracting IQ data in a predetermined section according to a predetermined timing from the signal data, and an IQ data analysis step (S19) of analyzing the extracted IQ data.

With this configuration, the measuring method according to the present embodiment can acquire IQ data in a predetermined section of the signal to be measured and analyze the IQ data only under a communication state satisfying the trigger condition, and can support a detailed analysis process of the IQ data at a desired signal type, channel, or reception status level, depending on the setting of the trigger condition.

Second Embodiment

Next, the configuration of the measuring device 1 according to a second embodiment will be described with reference to FIG. 8.

As shown in FIG. 8, a measuring device 1 according to the present embodiment has a system configuration in which a base station simulator signal processing device 10A and a base station simulator control device 50 are communicably connected via a hub 60. The base station simulator control device 50 is connected to the hub 60 by, for example, a network 65 using Ethernet (registered trademark).

The base station simulator signal processing device 10A has a conceptual configuration equivalent to that of the base station simulator 10 (see FIG. 1) according to the first embodiment, except for some functional blocks. The base station simulator signal processing device 10A according to the present embodiment operates as a base station simulator under the control of the base station simulator control device 50, and a pseudo base station control function unit that performs communication simulating a base station with the UE 70 (equivalent to the UE 70 in the first embodiment), a function unit that controls the analysis of IQ data, a function unit that displays the analysis result of IQ data, or the like are entrusted to the control functions of the base station simulator control device 50.

As shown in FIG. 8, the base station simulator signal processing device 10A includes a transmission/reception unit 11 having a reception unit 11a and a transmission unit 11b, a signal data calculation unit 12, a trigger signal output unit 13, a signal extraction unit 14, a storage unit 15, and an external interface (I/F) unit 16.

In the base station simulator signal processing device 10A, the reception unit 11a corresponds to the reception unit 21a of the base station simulator 10 according to the first embodiment. The signal data calculation unit 12 also corresponds to the analog signal processing unit 22 and the uplink layer processing unit 23. The trigger signal output unit 13 also corresponds to the trigger detection unit 25. The signal extraction unit 14 and the storage unit 15 also correspond to the IQ data memory unit 26. The external interface (I/F) unit 16 is interface means for transmitting and receiving signals to and from the hub 60.

The base station simulator control device 50 is composed of, for example, a computer device such as a personal computer (PC), and functions as a control PC that comprehensively controls various control operations of the base station simulator signal processing device 10A for testing the UE 70. As shown in FIG. 8, the base station simulator control device 50 includes a control unit 51, an IQ data analysis unit 52, an external interface (I/F) unit 53, a display unit 54, and an operation unit 55.

In the base station simulator control device 50, the control unit 51 has a control function equivalent to that of the control unit 20 of the base station simulator 10 according to the first embodiment. That is, the control unit 51 includes a pseudo base station control unit 51a, a trigger setting unit 51b, an analysis control unit 51c, and a display control unit 51d respectively equivalent to the pseudo base station control unit 20a, the trigger setting unit 20b, the analysis control unit 20c, and the display control unit 20d in the control unit 20 of the base station simulator 10 according to the first embodiment. Further, in the base station simulator control device 50, the IQ data analysis unit 52 is equivalent to the IQ data analysis unit 27 of the base station simulator 10 according to the first embodiment. The display unit 54 and the operation unit 55 are equivalent to the display unit 28 and the operation unit 29, respectively. The external interface (I/F) unit 53 is interface means for transmitting and receiving signals to and from the hub 60 via the network 65.

In the measuring device 1 having the system configuration shown in FIG. 8, the base station simulator signal processing device 10A and the base station simulator control device 50 operate as follows, respectively. The reception unit 11a receives the signal to be measured transmitted from the UE 70 (see step S12 in FIG. 4). The signal data calculation unit 12 converts the signal to be measured into a digital signal and executes a process of calculating the signal data (see step S13 in FIG. 4). The trigger signal output unit 13 outputs a trigger signal at a predetermined timing when a predetermined trigger condition is satisfied (see step S17 in FIG. 4). Upon receiving the trigger signal, the signal extraction unit 14 extracts IQ data in a predetermined section according to a predetermined timing from the signal data calculated by the signal data calculation unit (see step S18 in FIG. 4). Specifically, IQ data in a predetermined section is stored in the storage unit 15 composed of the ring buffer memory. Then, in the base station simulator control device 50, the IQ data analysis unit 52 executes an analysis process of IQ data in a predetermined section stored in the ring buffer memory (see step S19 in FIG. 4).

As described above, in the measuring device 1 according to the second embodiment, the base station simulator signal processing device 10A and the base station simulator control device 50 cooperate as a system to implement the IQ data analysis processing function similar to that of the single base station simulator 10 according to the first embodiment. That is, in the measuring device 1 according to the present embodiment, a control function for setting a trigger condition, outputting a trigger signal in a communication state satisfying the trigger condition, acquiring IQ data in a predetermined range in the PHY layer, and performing analysis thereof is the same as the base station simulator 10 according to the first embodiment. Thus, the measuring device 1 according to the second embodiment can be expected to have the same effect as the effect of the base station simulator 10 according to the first embodiment.

Further, the measuring device 1 according to the present embodiment has a configuration in which the signal extraction unit 14 (IQ data memory unit) and the IQ data analysis unit 52 are connected by a wired cable. With this configuration, the measuring device 1 according to the present embodiment can connect the same type of measuring devices in parallel when the number of base stations further increases, and can cope with the case where the signals to be transmitted and received increase.

In each of the above embodiments, the operation mode of 5G NR is illustrated, but the present invention can also be applied to an operation mode in which 5G NR and LTE are mixed, or a future operation mode in which 5G NR and the next communication standard are mixed.

INDUSTRIAL APPLICABILITY

As described above, a measuring device and a measuring method according to the present invention have an effect capable of setting conditions including a signal type, a channel, and a reception status, and performing detailed analysis of IQ data corresponding to a communication state satisfying the conditions, and are useful in general for measuring devices and measuring methods that perform analysis by setting conditions for uplink data from mobile terminals.

DESCRIPTION OF REFERENCE NUMERALS AND SIGNS

1 Measuring device
10 Base station simulator
10A Base station simulator signal processing device
11a Reception unit
12 Signal data calculation unit
13 Trigger signal output unit
14 Signal extraction unit
15 storage unit
21a Reception unit
22 Analog signal processing unit (signal data calculation unit)
23 Uplink layer processing unit (signal data calculation unit)
25 Trigger detection unit (trigger signal output unit)
26 IQ data memory unit (signal extraction unit, storage unit)
27 IQ data analysis unit
50 Base station simulator control device
52 IQ data analysis unit
70 UE (User Equipment: mobile terminal)
UL-RACH UpLink-Random Access Channel
UL-SCH Uplink Shared CHannel
PRACH (Physical Random Access CHannel) Random access physical channel
PUSCH Physical Uplink Shared CHannel
PUCCH Physical Uplink Control CHannel
UCI Uplink Control Information
SR (Scheduling Request) Schedule request signal
CSI (Channel State Information) Channel status information
HARQ-ACK (Hybrid Automatic Repeat reQuest ACKnowledgement) Request response signal
UCI (SR) UCI with SR inserted
UCI (CSI) UCI with CSI inserted
UCI (HARQ-ACK) UCI with HARQ-ACK inserted
SRS (Sounding Reference Signal) Sounding reference signal
DTX (Discontinuous Transmission) voice signal non-input state information
CRC NG Cyclic Redundancy Check (CRC) failure information
CRC OK CRC success information
Decode NG Decoding failure information
Decode OK Decoding success information

What is claimed is:

1. A measuring device comprising:
a receiver configured to receive a signal to be measured transmitted from a mobile terminal;
a processor configured to convert the signal to be measured into a digital signal and calculates signal data;

output a trigger signal at a predetermined timing when a predetermined trigger condition is satisfied, wherein the predetermined trigger condition includes a detection of a preset physical layer level channel, a preset control information, or a preset reception status from the received signal;

receive the trigger signal, and extract IQ data in a predetermined section according to the predetermined timing from the signal data; and an IQ data analysis processor configured to analyze the extracted IQ data, wherein the signal data extracted by the processor is signal data of a physical layer, and the trigger signal is output when the predetermined trigger condition is either uplink shared channel (ULSCH), uplink control information (UCI) (scheduling request (SR), Channel State Information (CSI), or hybrid automatic repeat request-acknowledgement (HARQ-ACK)), physical random access channel (PRACH) or sounding reference signal (SRS), a total received power is equal to or higher than a predetermined threshold, and the preset reception status is discontinuous transmission (DTX), cyclic redundancy check (CRC) NG, CRC OK, Decode NG, or Decode OK.

2. The measuring device according to claim 1, wherein the predetermined section according to the predetermined timing has a starting point before the predetermined timing.

3. The measuring device according to claim 1, further comprising:

a storage configured to store the signal data calculated by the processor in a ring buffer memory, wherein the processor is further configured to extract signal data in the predetermined section from the signal data stored in the ring buffer memory.

4. The measuring device according to claim 1, wherein the predetermined trigger condition is managed in accordance with a pseudo base station that simulates communication with the mobile terminal, and includes a period (act time) for activating a communication operation of the pseudo base station.

5. The measuring device according to claim 1, wherein the processor and the IQ data analysis processor are connected by a wired cable.

6. The measuring device according to claim 2, further comprising:

a storage configured to store the signal data calculated by the processor in a ring buffer memory, wherein the processor configured to extract signal data in the predetermined section from the signal data stored in the ring buffer memory.

7. The measuring device according to claim 2, wherein the predetermined trigger condition is managed in accordance with a pseudo base station that simulates communication with the mobile terminal, and includes a period (act time) for activating a communication operation of the pseudo base station.

8. The measuring device according to claim 2, wherein the processor and the IQ data analysis processor are connected by a wired cable.

9. The measuring device according to claim 3, wherein the predetermined trigger condition is managed in accordance with a pseudo base station that simulates communication with the mobile terminal, and includes a period (act time) for activating a communication operation of the pseudo base station.

10. A measuring method that measures a signal to be measured received from a mobile terminal that transmits and receives radio frequency signals by using a measuring device that tests an operation of a communication function of the mobile terminal by performing communication simulating a base station with the mobile terminal, the measuring method comprising:

acquiring an arbitrary channel of a physical layer used for receiving the signal to be measured, and a predetermined trigger condition in which a reception status of the signal to be measured in the channel is designated;

receiving the signal to be measured from the mobile terminal;

converting the signal to be measured into a digital signal and calculating signal data;

outputting a trigger signal at a predetermined timing when the predetermined trigger condition is satisfied;

receiving the trigger signal and extracting IQ data in a predetermined section according to the predetermined timing from the signal data; and analyzing the extracted IQ data, wherein the signal data is a physical layer data, and the trigger signal is output when the predetermined trigger condition is either uplink shared channel (ULSCH), uplink control information (UCI) (scheduling request (SR), Channel State Information (CSI), or hybrid automatic repeat request-acknowledgement (HARQ-ACK)), physical random access channel (PRACH) or sounding reference signal (SRS), a total received power is equal to or higher than a predetermined threshold, and the reception status is discontinuous transmission (DTX), cyclic redundancy check (CRC) NG, CRC OK, Decode NG, or Decode OK.

* * * * *